J. L. HUTCHINSON.
Water-Closet Bowl.
No. 199,831. Patented Jan. 29, 1878.
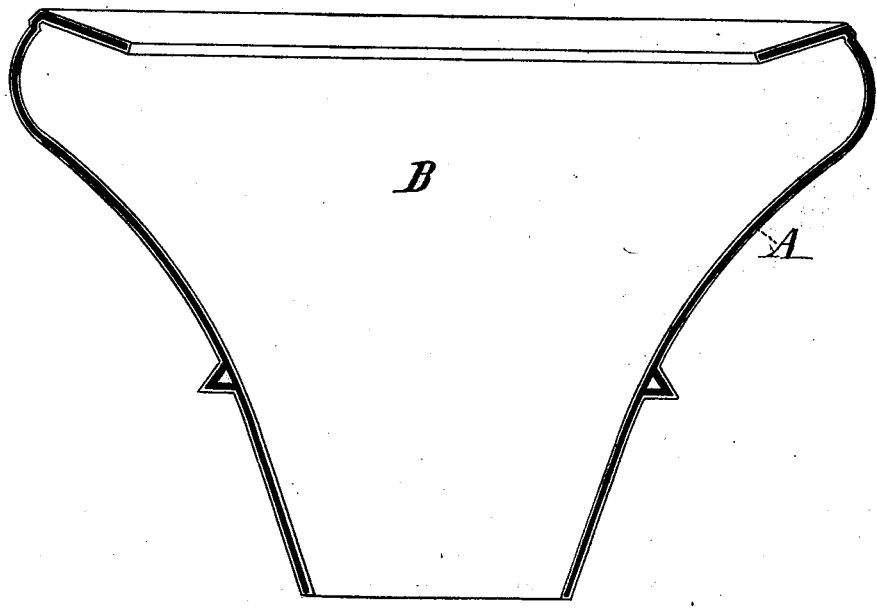

UNITED STATES PATENT OFFICE.

JESSE L. HUTCHINSON, OF BALTIMORE, MARYLAND.

IMPROVEMENT IN WATER-CLOSET BOWLS.

Specification forming part of Letters Patent No. 199,831, dated January 29, 1878; application filed January 5, 1878.

*To all whom it may concern:*

Be it known that I, JESSE L. HUTCHINSON, of the city of Baltimore and State of Maryland, have invented certain Improvements in Water-Closet Bowls, of which the following is a specification; and I do hereby declare that in the same is contained a full, clear, and exact description of my said invention, reference being had to the accompanying drawing, and to the letters of reference marked thereon.

This invention relates to a sheet-metal water-closet bowl having its surfaces covered with a vitreous substance to protect it against corrosion; and it consists in a water-closet bowl stamped or otherwise fabricated from sheet-metal, preferably iron, and coated or covered with some vitreous substance by immersing the sheet-metal bowl in a bath of fused glass or other substance partaking of the properties of glass, or by coating the metal with some vitrifiable substance, which is vitrified in a subsequent operation or process.

The drawing forming a part hereof is a section of a water-closet bowl formed in accordance with the present invention.

In the said drawing, A represents the sheet metal, and B the vitreous coating or covering of the same.

A sheet-metal bowl, coated in the manner described, is much lighter than a bowl of the same size having its body made of cast-iron, is more readily and cheaply manufactured, and is not as liable to fracture.

Water-closet pipes, in winter, are often obstructed by ice, and it is a common practice to pour hot water into the bowls with the view of clearing the pipes. Cast-iron and other bowls of a brittle composition are thus exposed to great danger of fracture by the sudden change of temperature to which they are subjected, while a sheet-metal bowl may be thus treated with impunity.

I am aware that cooking utensils and culinary vessels of various kinds have been coated with a preparation of glass; but I am not aware that water-closet bowls have been thus treated.

Having thus described my invention, what I claim as new, and wish to secure by Letters Patent of the United States, is—

A new article of manufacture, consisting of a sheet-metal water-closet bowl having its surface coated with some vitreous material, substantially as herein specified.

In testimony whereof I have hereunto subscribed my name this 13th day of December, in the year of our Lord 1877.

JESSE L. HUTCHINSON.

Witnesses:
W. W. WHARTON,
GEO. MCCAFFRAY.